US008396045B2

(12) United States Patent
Shi (10) Patent No.: US 8,396,045 B2
(45) Date of Patent: Mar. 12, 2013

(54) METHOD FOR CONFIGURING AND MANAGING ACCESS POINT AND ACCESS CONTROLLER

(75) Inventor: Yang Shi, Hangzhou (CN)

(73) Assignee: Hangzhou H3C Technologies Co., Ltd., Hangzhou, Zhejiang Province (CN)

( * ) Notice: Subject to any disclaimer, the term of this patent is extended or adjusted under 35 U.S.C. 154(b) by 890 days.

(21) Appl. No.: 12/344,616

(22) Filed: Dec. 29, 2008

(65) Prior Publication Data

US 2009/0141694 A1     Jun. 4, 2009

Related U.S. Application Data (63) Continuation of application No. PCT/CN2008/071604, filed on Jul. 10, 2008.

(30) Foreign Application Priority Data

Jul. 31, 2007   (CN) .......................... 2007 1 0141525
Aug. 13, 2007   (CN) .......................... 2007 1 0140574

(51) Int. Cl.
*H04W 4/00* (2009.01)

(52) U.S. Cl. ........ 370/338; 370/254; 370/331; 370/352; 455/422.1

(58) Field of Classification Search .................. 370/331, 370/338, 342, 254, 328, 352; 455/422.1
See application file for complete search history.

(56) References Cited

U.S. PATENT DOCUMENTS

| | | | | |
|---|---|---|---|---|
| 2002/0118644 | A1 * | 8/2002 | Moir | 370/230.1 |
| 2006/0026267 | A1 | 2/2006 | Godin et al. | |
| 2006/0056448 | A1 * | 3/2006 | Zaki et al. | 370/466 |
| 2006/0114839 | A1 | 6/2006 | Meier et al. | |
| 2006/0126507 | A1 * | 6/2006 | Nakayasu | 370/229 |
| 2006/0227726 | A1 * | 10/2006 | Zuniga et al. | 370/254 |
| 2007/0041315 | A1 | 2/2007 | Massengill | |
| 2007/0165580 | A1 * | 7/2007 | Ebata | 370/338 |
| 2007/0258414 | A1 * | 11/2007 | Cheng et al. | 370/338 |
| 2008/0040476 | A1 * | 2/2008 | Ishihara et al. | 709/224 |

FOREIGN PATENT DOCUMENTS

| | | |
|---|---|---|
| CN | 1196369 C | 12/2001 |
| CN | 1620068 A | 5/2005 |
| JP | 2001-282657 A | 10/2001 |
| KR | 1020050048939 A | 5/2005 |
| WO | 2005/079008 A1 | 8/2005 |

(Continued)

OTHER PUBLICATIONS

2nd Canadian Office Action dated Apr. 3, 2012; Appln. No. 2,652,795.

(Continued)

*Primary Examiner* — Pao Sinkantarakorn
*Assistant Examiner* — Richard K Chang
(74) *Attorney, Agent, or Firm* — Ladas & Parry LLP (57) ABSTRACT

Embodiments of the present invention disclose a method for configuring and managing access points AP and an access controller AC. The method includes: creating at least one virtual radio interface, each of which is assigned a standard Management Information Base (MIB) interface index, wherein each of the at least one virtual radio interface corresponds to at least one physical radio interface of at least one AP; determining a physical radio interface to which a virtual radio interface corresponds and sending configuration information on the virtual radio interface to the determined physical radio interface when there is a need to send the configuration information to the physical radio interface. By using embodiments of the present invention, a standard MIB can be re-used for operating APs, thereby costs for managing the APs are reduced.

16 Claims, 3 Drawing Sheets

FOREIGN PATENT DOCUMENTS

WO    2007/077618 A1    7/2007

OTHER PUBLICATIONS

1st European Office Action dated Mar. 28, 2012; Appln. No. 08 773 158.4-2416.
2nd Japanese Office Action Mailed Jun. 5, 2012; Appln. No. 2009-524892.
1st Russian Office Action; dated Jun. 30, 2010; Appln. No. 2008152224.
International Search Report; mailed Oct. 23, 2008; Appln. No. PCT/CN2008/071604.
ETSI European Telecommunication Standard; ETS 300 624; Aug. 1996; Source: ETSI TC-SMG; Reference: DE/SMG-061222P; ICS: 33.060.50; Global System for Mobile Communications; Digital Cellular Telecommunication System (Phase 2); Interworking of GSM Network Management (NM) Procedures and messages at the Base Station Controller (BSC) (GSM 12.22); 66 pages.

* cited by examiner

METHOD FOR CONFIGURING AND MANAGING ACCESS POINT AND ACCESS CONTROLLER

FIELD OF THE INVENTION

The present invention relates to wireless communication technologies, and particularly to a method for configuring and managing an access point (AP), and an access controller.

BACKGROUND OF THE INVENTION 802.11 Wireless Local Area Network (WLAN) provides a wireless access service in a local area network (LAN). An Access point (AP), which is one of important components of WLAN, is a radio transceiver. The AP may convert data received from a wired network, such as Internet, into radio signals and transmit the radio signals, and convert received radio signals into data and forward the data to the wired network.

At present, 802.11 WLAN has been widely employed by users such as enterprises. Those users have a large amount of APs, desire reasonable security, and require high Quality of Service (Qos). Thus, effective managing measures needs employing to ensure the manageability of the network and to reduce costs of operation and management.

A conventional AP, also referred to as a Fat AP, such as an AP used widely in households nowadays, may include all of functions defined in 802.11 protocols. A Management Information Base (MIB) is a set of objects which are managed by target APs. The 802.11 protocols have established dedicated MIB standards which include not only configuration parameters of a FAT AP, e.g. parameters configured in a radio interface, such as a beacon, but also status information and status statistical information of the FAT AP, such as the number of packets transmitted to and received from a radio interface and the working status of the radio interface. In this way, a network administrator is able to configure and manage the radio interface of the FAT AP via an interface of the MIB. The following is a data structure of the MIB defined in an 802.11 protocol:

```
Dot11OperationEntry::=
    SEQUENCE {    dot11MACAddress              MacAddress,
                  dot11RTSThreshold            INTEGER,
                  dot11ShortRetryLimit         INTEGER,
                  dot11LongRetryLimit          INTEGER,
                  dot11FragmentationThreshold  INTEGER,
                  dot11MaxTransmitMSDULifetime Unsigned32,
                  dot11MaxReceiveLifetime      Unsigned32,
                  dot11ManufacturerID          DisplayString,
                  dot11ProductID               DisplayString }
```

The MacAddress denotes a Media Access Control (MAC) address of a radio interface, the RTSThreshold denotes a re-transmission time threshold of the radio interface, the ShortRetryLimit denotes a short retry limit of the radio interface, the LongRetryLimit denotes a long retry limit of the radio interface, the FragmentationThreshold denotes a fragmentation threshold of a packet transmitted via the radio interface, the MaxTransmitMSDULifetime denotes the maximum lifetime of transmitting a MAC service data unit (SDU) of the radio interface, the MaxReceiveLifetime denotes the maximum receiving lifetime of the radio interface, the ManufacturerID denotes the identifier of the manufacturer of the AP, and the ProductID denotes the product identifier of the AP. According to the MIB table, the network administrator may configure the parameters of the radio interface on the FAT AP.

It is complex to manage FAT APs, for example, a WLAN of an enterprise may include hundreds of or thousands of FAT APs and the administrator has to manage each FAT AP individually, so high costs of network operation and management may be brought out. For this reason, the Configuration and Provisioning for Wireless Access Point (CAPWAP) Work-Group (WG) of the Internet Engineering Task Force (IETF) has proposed a concept of a Fit AP. The Fit AP mainly fulfills the real-time functions, such as packet acknowledging, Beacon message frame transmission, and cooperates with an Access Controller (AC) to implement other functions such as Fit AP management and user authentication, herein, the AC implements centralized management of APs through the CAPWAP protocol.

SUMMARY

Embodiments of the present invention provide a method for configuring and managing an Access point AP, and an Access Controller AC, so as to configure and manage the AP.

The method for configuring an AP provided by the embodiments of the present invention may be employed by an AC and include:

creating at least one virtual radio interface, each of which is assigned a standard Management Information Base (MIB) interface index, wherein each of the at least one virtual radio interface corresponds to at least one physical radio interface of at least one AP;

determining a physical radio interface to which a virtual radio interface corresponds and sending configuration information on the virtual radio interface to the determined physical radio interface when there is a need to send the configuration information to the physical radio interface.

A method for managing an AP provided by the embodiments of the present invention includes: managing a physical radio interface of the AP through a virtual radio interface which is created in advance and corresponds to the physical radio interface, wherein the virtual radio interface is created according to a standard MIB.

The AC provided by the embodiments of the present invention includes:

a first module, adapted to create at least one virtual radio interface, each of which is assigned a standard MIB interface index, wherein each of the at least one virtual radio interface corresponds to at least one physical radio interface of at least one AP;

a second module, adapted to when configuring a physical radio interface, determine a virtual radio interface to which the physical radio interface corresponds and send configuration information on the determined virtual radio interface to the physical radio interface, wherein the configuration information on the determined virtual radio interface is configured according to a standard MIB.

Another AC provided by the embodiments of the present invention includes:

a first module, adapted to create at least one virtual radio interface, each of which is assigned a standard MIB interface index, wherein each of the at least one virtual radio interface corresponds to at least one physical radio interface of at least one AP;

a second module, adapted to when managing a physical radio interface, determine a virtual radio interface to which the physical radio interface corresponds and store management information on the physical radio interface on the determined virtual radio interface.

An access controller provided by an embodiment of the present invention is used in a centralized wireless local area network for controlling at least one access point and includes:

a virtual radio interface, corresponding to a physical radio interface of a access point;

a configuration module, for receiving management operation on the virtual radio interface and mapping the management operation to operations on the physical radio interface which is corresponding to the virtual radio interface.

An access controller provided by an embodiment of the present invention is used in a centralized wireless local area network for controlling at least one access point and includes:

a virtual radio interface which is used as a network management agent for a physical radio interface.

An access controller provided by an embodiment of the present invention includes a virtual resource for representing a physical resource of an access point to a network management operation.

In an embodiment of the present invention, a fit AP is used in a centralized wireless local area network (WLAN) and the WLAN includes an access controller (AC). A method for managing the fit access point (AP) provided by an embodiment of the present invention includes:

receiving a network management operation on a virtual radio interface of the AC via a management channel between the AC and a network administrator, wherein the virtual radio interface is corresponding to a physical radio interface;

controlling a physical radio interface to which the virtual radio interface corresponds according to the network management operation on the virtual radio interface via a channel between the AC and the AP. Compared with the prior art, in the embodiments of the present invention, the virtual radio interface is established on the AC for each to-be-managed radio interface of each Fit AP, a standard MIB interface index is assigned for each of the virtual radio interface, and a correspondence relationship between the index of the virtual radio interface and the identifiers of the AP and the radio interface is stored. Therefore, the administrator is able to find out a specific virtual radio interface though the standard MIB interface index, and further find out a certain to-be-managed physical radio interface of a Fit AP. For the administrator, the combination of multiple Fit APs in the AC may be considered as a Fat AP. Thereby, by using the method and AC for operating Fit APs provided by the embodiments of the present invention, the AC is enabled to re-use the standard MIB, configure and manage the Fit APs, and also reduce the management costs of the Fit APs.

DETAILED DESCRIPTION OF THE INVENTION

Detailed descriptions are hereinafter given to the present invention with reference to embodiments and accompanying drawings. In the embodiments, re-using a MIB of 802.11 standards is taken as an example.

Figure 1:
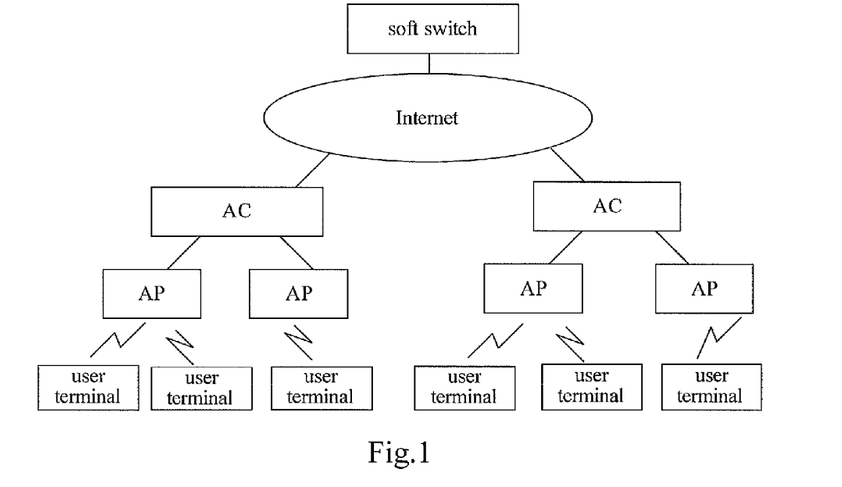
FIG. 1 is a structure of a WLAN based on Fit APs in accordance with the prior art.

FIG. 1 is a structure of a WLAN based on Fit APs in accordance with the prior art. As shown in FIG. 1, before providing access for wireless users, each AC should complete configuring parameters of Fit APs. After the users access, the AC may store status statistical information of each radio interface sent by each Fit AP to facilitate a network administrator to manage the APs.

In a centralized WLAN defined in CAPWAP, an Simple Network Management Protocol (SNMP) agent in the AC may configure radio parameters of all the Fit APs and provide status statistical information of all the Fit APs for the network. Generally, a Fit AP need not provide the SNMP agent itself. As long as the AC provides the service of the SNMP agent, the administrator may configure the APs via the SNMP agent in the AC.

Because a Management Information Base (MIB) defined in current wireless technical standards (such as 802.11 series standards) always operates the APs via interface indexes (such as Ifindex) of physical radio interfaces of the APs, but the AC does not possess any actual physical radio interfaces, so it is difficult to directly use the MIBs defined in current wireless technical standards to operate (such as manage and configure) the Fit APs.

In this situation, some manufacturers have set up private MIB standards for operating Fit APs which support the CAPWAP. But the approach has disadvantages. Since the approach does not support the MIB standards of 802.11 protocols, current network management software has to further be developed to support the private MIBs. Another serious problem is that when there are wireless devices supporting different MIB standards from multiple manufacturers respectively in the network, the costs of managing the wireless devices will remarkably increase. In addition, considering the objective of establishing the CAPWAP by the IETF, it is unacceptable to re-define the MIB standards for complying with new 802.11 protocol extensions, because the CAPWAP protocol needs to not only support current 802.11 protocols, but also flexibly support 802.16 protocols or even RFID protocols, which also challenges the design work for CAPWAP MIB standards.

For the above reasons, a technique for operating APs is urgently needed. The technique should be able to re-use current wireless technical standards (e.g. 802.11 standards) and subsequent new wireless technical standards (e.g. extension of 802.11 standards), so as to reduce the costs for configuring and managing the Fit APs.

Embodiments of the present invention provide a method for configuring and managing Fit APs, including creating at least one virtual radio interface, each of which is based on an interface index of a standard MIB and corresponds to at least one physical radio interface of at least one Fit AP; when configuring a physical radio interface of a Fit AP, determining a virtual radio interface to which the physical radio interface corresponds according to a correspondence relationship and sending configuration information configured on the virtual radio interface via the standard MIB to the physical radio interface; when managing the physical radio interface of the Fit AP, determining the virtual radio interface to which the physical radio interface corresponds according to the correspondence relationship and storing the management information on the virtual radio interface. The procedure of configuring and managing radio interfaces of Fit APs will be described in detail as follows.

Figure 2:
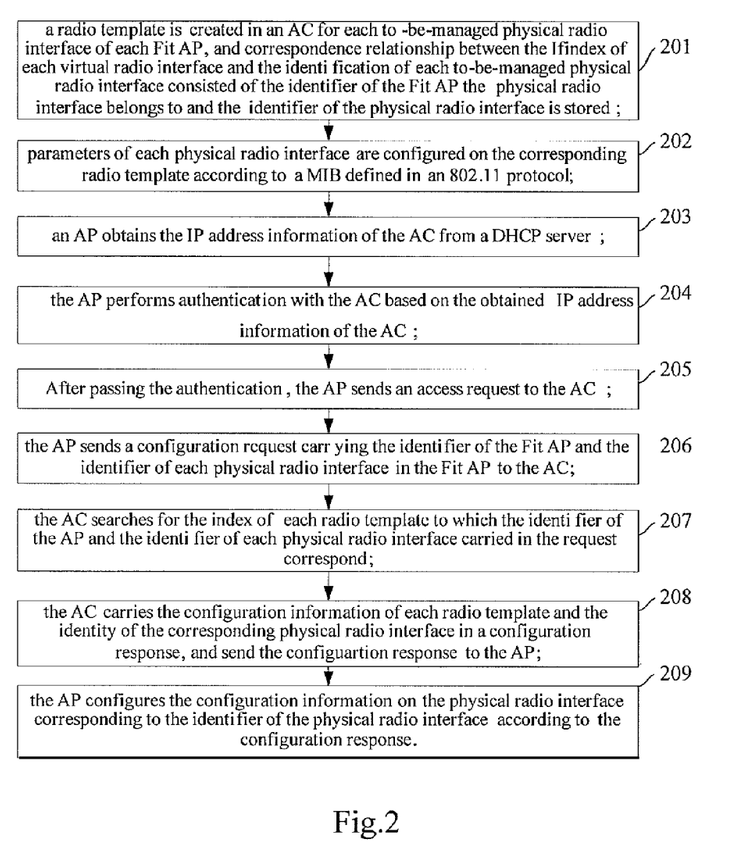
FIG. 2 is a flow chart of configuring Fit APs in accordance with an embodiment of the present invention.

FIG. 2 is a flow chart of configuring radio interfaces of Fit APs in accordance with an embodiment of the present invention. As shown in FIG. 2, the process is as follows.

Step 201: a virtual radio interface, which is also referred to as a radio template, is created in an AC for each to-be-managed physical radio interface of each Fit AP. A unique interface index (Ifindex) is assigned to each virtual radio interface. Each virtual radio interface corresponds to at least one to-be-managed radio interface of at least one to-be-managed Fit AP. Each to-be-managed physical radio interface may be identified by the identifier of the AP to which the physical radio interface belongs together with the identifier of the physical radio interface, i.e. the combination of the identifier of the AP and the identifier of the physical radio interface form the unique identification of the physical radio interface. The correspondence relationship between the Ifindex of each virtual radio interface and the identification of each to-be-managed physical radio interface which consists of the identifier of the Fit AP the physical radio interface belongs to and the identifier of the physical radio interface is stored. For instance, the Ifindex of radio template 3 is set as 3, the identifiers of the Fit AP and the physical radio interface to which the radio template 3 corresponds are 001 and 010 respectively. The Ifindex of radio template 9 is set as 9, the identifiers of the Fit AP and the physical radio interface to which the radio template 9 corresponds are 010 and 100 respectively. The above are merely examples of the correspondence relationship between the Ifindex and the physical radio interface and are not used for limiting the correspondence relationship.

The virtual radio interfaces are not actual physical radio interfaces but logical interfaces, i.e. representing one or more physical radio interfaces in logic. It should be noted that if more than one to-be-managed physical radio interface have the same configuration information, the more than one physical radio interfaces may correspond to a common created virtual radio interface.

In the present embodiment, the setting of the Ifindex of a virtual radio interface should comply with a standard MIB, such as MIBs defined in existing 802.11 series standards (but not limited to 802.11 series), so a network administrator is able to find out a specific virtual radio interface by using an Ifindex of a standard 802.11 MIB. For the network administrator, a group of Fit APs managed by the AC is similar to a Fat AP of 802.11 standards, and an AC agent is similar to the agent of the Fat AP. Thus, the AC according to the present embodiment may re-use at least one of standard MIBs defined in existing wireless access techniques. Since the MIBs are already defined in related standards, no detailed description will be given herein.

Step 202: before Fit APs are put to use, radio parameters of a physical radio interface to which each virtual radio interface corresponds are configured on each virtual radio interface according to a standard MIB.

In the step, the operation of "setting radio parameters of the physical radio interface" may be carried out by the network administrator.

Radio parameters may include parameters such as beacon, WEP key, and so on. For example, the network administrator may find out a virtual radio interface by using SNMP to search for an Ifindex of the standard MIB (e.g. a dot11OperationTable), and configure the parameters on the virtual radio interface. The parameters set in the step are determined by the adopted wireless protocol.

To specify the correspondence relationship between each virtual radio interface and each physical radio interface of each Fit AP, a byname parameter may be set for each virtual radio interface. The value of the byname parameter is the identifiers of the Fit AP and the physical radio interface to which the virtual radio interface corresponds. For example,

[AC] interface wlan-radio-template 1
here, radio parameters of the virtual radio interface 1 may be set, which includes a byname parameter set for identifying the virtual radio interface;
[AC] interface wlan-radio-template 2
in here, radio parameters of virtual radio interface 2 may be set, which includes a byname parameter set for identifying the virtual radio interface.

As described in Step 201, each virtual radio interface corresponds to an actual physical radio interface of a Fit AP, so after the preparations are finished, the AC agent has already known the radio parameter configuration of the physical radio interface of the Fit AP.

Step 203: a Fit AP obtains the IP address information of the AC from a Dynamic Host Configuration Protocol (DHCP) server.

Step 204: the Fit AP performs authentication with the AC according to the obtained IP address information of the AC.

Step 205: after passing the authentication, the Fit AP sends an access request to the AC.

Step 206: the Fit AP receives an access response from the AC, and sends a configuration request to the AC. The configuration request carries the identifier of the Fit AP and an identifier of a physical radio interface of the Fit AP.

Step 207: the AC receives the configuration request, and searches the stored correspondence relationship for an Ifindex of a virtual radio interface to which the Fit AP identifier and the physical radio interface identifier carried in the configuration request correspond. Herein, the correspondence relationship records the correspondence between the ifindex of each virtual radio interface and the identification of each to-be-managed physical radio interface, wherein the identification of each physical radio interface consists of the identifier of the Fit AP the physical radio interface belongs to and the identifier of the physical radio interface.

Step 208: the AC finds out the virtual radio interface by using the found Ifindex, carries the configuration information on the virtual radio interface and the identifier of the physical radio interface in a configuration response, and sends the configuration response to the Fit AP.

The format of the configuration response of dot11OperationTable defined in 802.11 may be as follows.

```
    0                   1                   2                   3
    0 1 2 3 4 5 6 7 8 9 0 1 2 3 4 5 6 7 8 9 0 1 2 3 4 5 6 7 8 9 0 1
   +-+-+-+-+-+-+-+-+-+-+-+-+-+-+-+-+-+-+-+-+-+-+-+-+-+-+-+-+-+-+-+-+
   |   Radio ID    |    Reserved   |         RTS Threshold         |
   +-+-+-+-+-+-+-+-+-+-+-+-+-+-+-+-+-+-+-+-+-+-+-+-+-+-+-+-+-+-+-+-+
   |  Short Retry  |   Long Retry  |      Fragmentation Threshold  |
   +-+-+-+-+-+-+-+-+-+-+-+-+-+-+-+-+-+-+-+-+-+-+-+-+-+-+-+-+-+-+-+-+
   |                                                               |
   |                        Tx MSDU Lifetime                       |
   |                                                               |
   +-+-+-+-+-+-+-+-+-+-+-+-+-+-+-+-+-+-+-+-+-+-+-+-+-+-+-+-+-+-+-+-+
   |                                                               |
   |                        Rx MSDU Lifetime                       |
   |                                                               |
   +-+-+-+-+-+-+-+-+-+-+-+-+-+-+-+-+-+-+-+-+-+-+-+-+-+-+-+-+-+-+-+-+
``` where, the RadioID is the identification of the physical radio interface, the Reserved is a field reserved the RTS Threshold is a re-transmission time threshold, the Short Retry is a short retry limit, the Long Retry is a long retry limit, the Fragmentation Threshold is a fragmentation threshold of a packet, the Tx MSDU Lifetime is the maximum lifetime of transmitting a MAC service data unit (MSDU) and Rx MSDU Lifetime is the maximum lifetime of receiving the MSDU.

Step 209: the Fit AP receives the configuration response and configures the configuration information carried in the configuration response on the physical radio interface corresponding to the physical radio interface identifier carried in the configuration response.

It can be seen in FIG. 2 that, through creating the virtual radio interface in the AC for each to-be-managed physical radio interface of each Fit AP, establishing the correspondence relationship between the Ifindex of each virtual radio interface and the identification of the physical radio interface which consist of the identifier of the Fit AP the physical radio interface belongs to and the identifier of the physical radio interface, configuring the radio parameters of each virtual radio interface through SNMP according to the standard MIB defined in 802.11, an AC supporting the CAPWAP protocol is enabled to re-use standard MIBs defined in 802.11 protocols for configuring the Fit AP, thereby the costs for managing the Fit AP are reduced.

Figure 3:
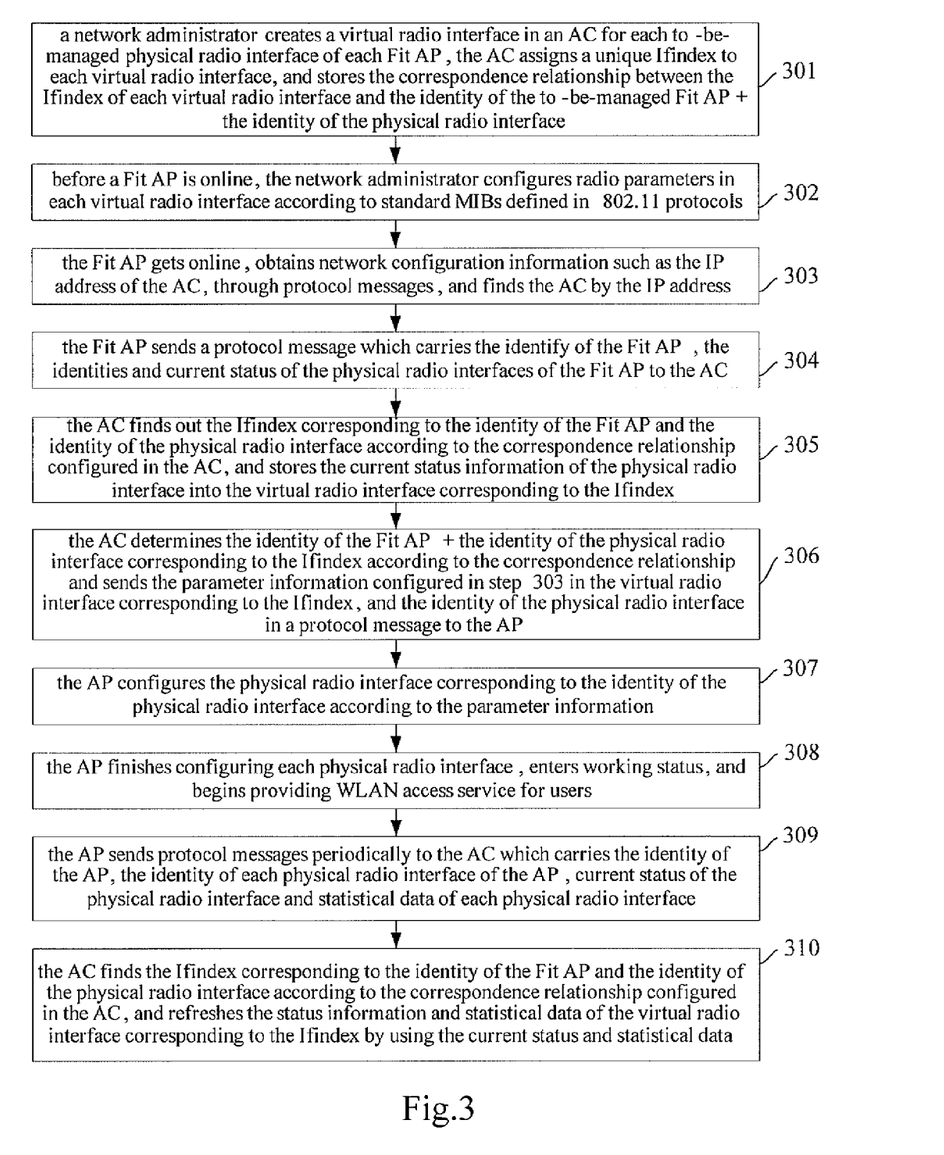
FIG. 3 is a flow chart of configuring and managing Fit APs in accordance with an embodiment of the present invention.

FIG. 3 is a flow chart of configuring and managing Fit APs in accordance with an embodiment of the present invention. As shown in FIG. 3, the procedure is described as follows.

Step 301: a virtual radio interface is created in an AC for each to-be-managed physical radio interface of each Fit AP. A unique interface index (Ifindex) is assigned to each virtual radio interface. The correspondence relationship between the Ifindex of each virtual radio interface and the identification of each to-be-managed physical radio interface which consists of the identifier of the Fit AP the physical radio interface belongs to and the identifier of the physical radio interface is stored.

The virtual radio interface is not an actual physical radio interface but a logical interface which represents a logical physical radio interface.

In the present embodiment, the setting of the Ifindex of a virtual radio interfaces should comply with a MIB standard defined in existing 802.11 series (but not limited to 802.11 series), so a network administrator is able to find out a is specific virtual radio interface by using an Ifindex of a standard 802.11 MIB. For the network administrator, a group of Fit APs managed by the AC is similar to a Fat AP of 802.11 standards, and the AC agent is similar to the agent of the Fat AP. Thus, the AC according to the present embodiment may re-use at least one of standard MIBs defined in existing wireless access techniques. Since the MIBs are already defined in related standards, no detailed descriptions will be given herein.

Step 302: before Fit APs are put to use, radio parameters of a physical radio interface to which each virtual radio interface corresponds are configured on each virtual radio interface according to a standard MIB defined in a 802.11 protocol.

Radio parameters may include parameters such as beacon, WEP key, and so on. For example, the network administrator may find out a virtual radio interface by using SNMP to search for an Ifindex of the standard MIB (e.g. a dot11OperationTable), and configure the parameters on the virtual radio interface.

As described in Step 301, each virtual radio interface corresponds to an actual physical radio interface of a Fit AP, so after the preparations are finished, the AC agent has already known the radio parameter configuration of the physical radio interface of the Fit AP.

Step 303: a Fit AP gets on-line, obtains network configuration information, e.g. the IP address of the AC, through a protocol message and finds the AC according to the IP address.

Step 304: the Fit AP sends a protocol message which carries the identifier of the Fit AP, an identifier of a physical radio interface of the Fit AP, and current status of the physical radio interface to the AC.

The status of the physical radio interface may include operation status, MAC address, etc., of the physical radio interface.

In the step, since protocol messages defined in different communication management protocols respectively may have different formats and different contents, so the status information of the physical radio interface carried in the protocol message sent by the Fit AP to the AC may be changed according to the communication management protocol adopted by the Fit AP and the AC.

Step 305: the AC receives the protocol message sent by the Fit AP, finds out an Ifindex corresponding to the Fit AP identifier and the physical radio interface identifier carried in the protocol message according to the correspondence relationship between the Ifindex of each virtual radio interface and the identification of each physical radio interface which consists of the identifier of the Fit AP the physical radio interface belongs to and the identifier of the physical radio interface, and then stores the status information of the physical radio interface carried in the protocol message on the virtual radio interface corresponding to the Ifindex. Herein the correspondence relationship is configured in the AC.

Step 306: the AC determines an Fit AP identifier and a physical radio interface identifier to which each Ifindex corresponds according to the correspondence relationship between the Ifindex of each virtual radio interface and the identification of each physical radio interface which consists of the identifier of the Fit AP the physical radio interface belongs to and the identifier of the physical radio interface, and carries the parameter information configured on the virtual radio interface corresponding to the Ifindex in Step 302 and physical radio interface identifier in a protocol message, and sends the protocol message to the AP corresponding to the Fit AP identifier.

Alternatively, in Step 302, after the network administrator configures the parameters, according to the correspondence relationship established in step 301, the AC may finds out the identification of a physical radio interface to which the Ifindex of each virtual radio interface corresponds, which consists of the identifier of a Fit AP the physical radio interface belongs to and the identifier of the physical radio interface, and additionally stores the correspondence relationship between the parameter information configured on each virtual radio interface and the identification of each physical radio interface which consists of the identifier of the Fit AP the physical radio interface belongs to and the identifier of the physical radio interface. Thereby, in current Step 306, the AC may directly send the identifier of each physical radio interface of the Fit AP and parameter information corresponding to each physical radio interface in a protocol message to the Fit AP without searching the correspondence relationship established in Step 301.

Step 307: the Fit AP receives the protocol message from the AC, and configures the parameter information carried in the protocol message on the physical radio interface corresponding to the physical radio interface identifier carried in the protocol message.

Step 308: after finishing the configuration of each physical radio interface, the Fit AP enters working status and begins providing WLAN access service for users.

Step 309: the Fit AP sends protocol messages periodically to the AC, each of which carries the identifier of the Fit AP, an identifier of a physical radio interface of the Fit AP, current status of the physical radio interface and statistical data of the physical radio interface.

The status of the physical radio interface may include the operation status of the physical radio interface and so on. The detailed contents of the status are determined by the communication management protocol adopted by the Fit AP and the AC. The statistical data of the physical radio interface may include the number of packets sent and received by the physical radio interface. The detailed contents of the statistical data also may be determined by the communication management protocol adopted by the Fit AP and the AC.

Step 310: the AC receives a protocol message from the Fit AP, finds the Ifindex to which the Fit AP identifier and the physical radio interface identifier carried in the protocol message correspond according to the correspondence relationship between the Ifindex of each virtual radio interface and the identification of each physical radio interface which consists of the identifier of the Fit AP the physical radio interface belongs to and the identifier of the physical radio interface, and refreshes status information and statistical data on the virtual radio interface corresponding to the Ifindex with the current status information and the statistical data of the physical radio interface carried in the protocol message.

In practice, the network administrator may inquire information such as the status and statistical data of a Fit AP from the AC so as to carry out centralized management of Fit APs. Detailed descriptions will be given as follows by taking an example of searching for a Dot11OperationTable through SNMP for information such as the status information and statistical data of a Fit AP.

Figure 4:
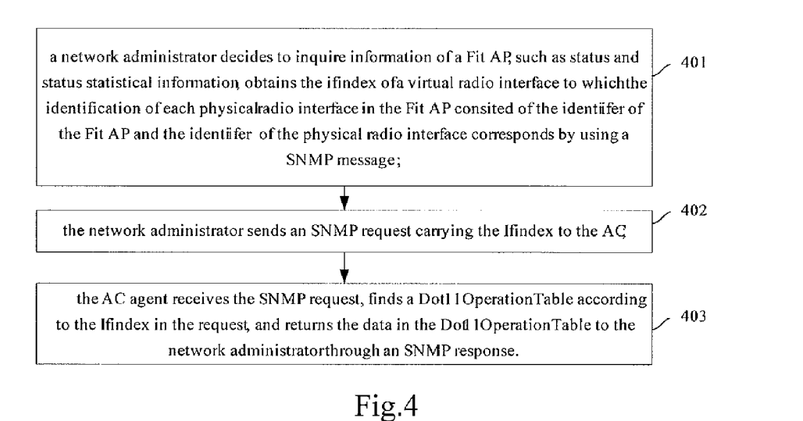
FIG. 4 is a flow chart of searching for a Dot11OperationTable according to a Simple Network Management Protocol in accordance with an embodiment of the present invention.

FIG. 4 is a flow chart of searching for a Dot11OperationTable according to SNMP in accordance with an embodiment of the present invention. As shown in FIG. 4, the procedure is as follows.

Step 401: when deciding to inquire information of a Fit AP, such as status information and status statistical information of the Fit AP, a network administrator obtains, through a SNMP message, an Ifindex of a virtual radio interface to which the identifier of the Fit AP and an identifier of a physical radio interface correspond.

Step 402: the network administrator sends an SNMP request carrying the Ifindex to the AC.

Step 403: the AC agent receives the SNMP request, finds a Dot11OperationTable according to the Ifindex in the request, and returns data such as the status information and status statistical information and so on in the Dot11OperationTable to the network administrator through an SNMP response.

It can be seen from the embodiments shown in FIG. 3 and FIG. 4, through creating the virtual radio interface in the AC for each to-be-managed physical radio interface of each Fit AP, establishing the correspondence relationship between the Ifindex of each virtual radio interface and the identification of each physical radio interface which consists of the identifier of the Fit AP the physical radio interface belongs to and the identifier of the physical radio interface, the network administrator is able to configure the radio parameters on each virtual radio interface according to the MIB standards defined in 802.11 and the AC is also able to store the status information and status statistical information of the physical radio interface sent by the Fit AP on the virtual radio interface according to the MIB defined in 802.11. Thereby, an AC supporting the CAPWAP protocol is enabled to re-use a standard MIB defined in a 802.11 protocol for configuring and managing the Fit AP, thereby the costs for managing the Fit AP are reduced.

Embodiments of the present invention also provide a method for configuring and managing APs which may be applied in a wireless network. The wireless network at least includes an AC and one or multiple APs controlled by the AC. There is a management channel between the AC and a network administrator, and the AC is managed by the network administrator via the management channel. The AC also includes one or multiple virtual radio interfaces visible to the network administrator, and each virtual radio interface corresponds to at least one physical radio interface.

After receiving configuration information for a virtual radio interface from the network administrator, the AC sends the configuration information to a physical radio interface of an AP via a channel between the AC and the AP according to the correspondence relationship between each virtual radio interface and each physical radio interface. Specifically, when detecting that the AP is online, the AC sends the configuration information to the physical radio interface of the AP via the channel between the AC and the AP according to the correspondence relationship between each virtual radio interface and each physical radio interface.

The AC stores information of the physical radio interface reported by the AP on the virtual radio interface to which the physical radio interface corresponds. When the network administrator inquires the information, the AC sends the information to the network administrator via the management channel between the AC and the network administrator.

Embodiments of the present invention also provide a method for configuring and managing APs, which may be applied in a distributed wireless network. The distributed wireless network at least includes an AC and at least one AP controlled by the AC. Configuration information for a physical radio interface of an AP is stored on a virtual radio interface created for the physical radio interface in advance. When a network administrator inquires the configuration information, the AC sends the configuration information to the network administrator via the management channel between the AC and the network administrator. When receiving configuration information for a virtual radio interface from the network administrator, the AC sends the configuration information to the physical radio interface of the AP to which the virtual radio interface corresponds via a channel between the AC and the AP.

The management channel and the channel between the AC and the AP are different. The management channel is based on Simple Network Management Protocol (SNMP), while the channel between the AC and the AP is based on Configuration And Provisioning for Wireless Access Point (CAPWAP).

The AC assigns a unique interface index (Ifindex) for each virtual radio interface so that each virtual radio interface is visible to the network administrator. The information of the physical radio interface reported by the AP may include configuration information, and/or status information, and/or status statistical information.

It can be seen that, for CAPWAP, the interaction procedure of configuration and management is not changed at all, while the network administrator can configure and manage all physical radio interfaces of all Fit APs controlled by an AC by using a standard MIB (such as MIBs authorized and issued by various standardization organizations, or factually non-private MIBs (also referred as public MIBs), e.g. MIB defined in 802.11) and the method provided by embodiments of the present invention. Thus, for the network administrator, an AC may be considered as a Fat AP which has plurality of physical radio interfaces.

Improvement of the AC is described as follows. It should be noted that the improvements of the AC is in a logical manner. Those skilled in the art should understand a device may be divided in various logical manners, but the differences are caused merely by different view points or different criterions, and they are actually essentially the same.

In embodiments of the present invention, an AC may include a virtual radio interface creating module, a configuration module and a management module. The virtual radio interface creating module is adapted to create at least one virtual radio interface, each of which is assigned a unique MIB interface index and corresponds to at least one physical radio interface of at least one AP. The configuration module is adapted to determine a physical radio interface to which a virtual radio interface corresponds and send configuration information on the virtual radio interface to the determined physical radio interface when there is a need to send the configuration information to the physical radio interface, wherein the configuration information on the virtual radio interface is configured according to a standard MIB. The management module is adapted to when managing a physical radio interface, determine a virtual radio interface to which the physical radio interface corresponds and store management information of the physical radio interface on the determined virtual radio interface.

The AC may also include only the virtual radio interface creating module and the configuration module, or include only the virtual radio interface creating module and the management module.

Based on the embodiments above, the AC may also include a correspondence relationship storing module, which is adapted to store the correspondence relationship between the Ifindex of each virtual radio interface created by the virtual radio interface creating module and the identification of each physical radio interface which consists of the identifier of the Fit AP the physical radio interface belongs to and the identifier of the physical radio interface, where the combination of the identifier of the Fit AP and the identifier of the physical radio interface is used for identifying the physical radio interface.

The configuration module may include a virtual radio interface configuration module and a configuration information sending module. The virtual radio interface configuration module is adapted to configure radio configuration information on each virtual radio interface according to the standard MIB. The configuration information sending module is adapted to search the correspondence relationship storing module for a virtual radio interface to which a Fit AP identifier and a physical radio interface identifier carried in a configuration request sent by a Fit AP correspond, and send the configuration information on the virtual radio interface and the physical radio interface identifier to the Fit AP corresponding to the Fit AP identifier.

The management module may also include a management information storing module and an inquiry response module. The management information storing module is adapted to receive management information sent by a physical radio interface of a Fit AP, search the correspondence relationship storing module for an Ifindex of a virtual radio interface to which the identifier of the Fit AP and the identifier of the physical radio interface correspond, store the management information on the virtual radio interface corresponding to the Ifindex. The management information may include status information and status statistical information. The inquiry response module is adapted to receive an inquiry request from a network administrator for the physical radio interface of the Fit AP, search the correspondence relationship storing module for the Ifindex of the virtual radio interface to which the identifier of the Fit AP and the identifier of the physical radio interface correspond, and send the management information stored on the virtual radio interface corresponding to the Ifindex to the network administrator.

The schematic structure of the AC is described as follows with reference to two embodiments.

Figure 5:
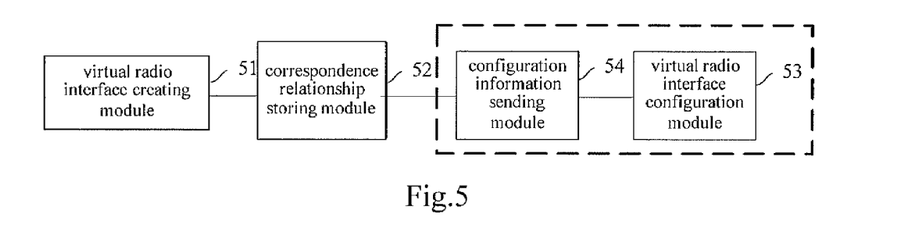
FIG. 5 is a schematic illustrating a structure of an AC under the structure of a WLAN based on Fit APs in accordance with an embodiment of the present invention.

FIG. 5 is a schematic illustrating a structure of an AC under the structure of a WLAN based on Fit APs in accordance with an embodiment of the present invention. As shown in FIG. 5, the AC mainly includes the following modules.

A virtual radio interface creating module 51 is adapted to create at least one virtual radio interface as instructed by a network administrator, and establish an interface index based on a standard MIB for each virtual radio interface. For example, the Ifindex of virtual radio interface 3 is 3, and the Ifindex of virtual radio interface 9 is 9. Therefore, the network administrator is able to find out a certain virtual radio interface through the standard MIB by using a network management protocol, and configure and manage a physical radio interface of a Fit AP to which the virtual radio interface corresponds.

A correspondence relationship storing module 52 is adapted to store the correspondence relationship between the interface index of each virtual radio interface and the identification of each physical radio interface which consists of the identifier of a Fit AP the physical radio interface belongs to and the identifier of the physical radio interface. For example, number 3 indicates the third physical radio interface of Fit AP 1, while number 9 indicates the second physical radio interface of Fit AP 3.

A virtual radio interface configuration module 53 is adapted to store configuration information configured by the network administrator on a virtual radio interface. The configuration information is usually stored as configuration files. Since the way for storing the configuration information is determined by inner implementing of the device, due to the mechanism of the inner implementing of the device may be different, the format of files may also be different, as long as the agent of the device is able to find out information in the configuration file and is able to respond to the network administrator properly when the network administrator reads or writes configuration information through MIB.

A configuration information sending module 54 is adapted to obtain an interface index of a virtual radio interface to which a Fit AP identifier and a physical radio interface identifier carried in a configuration request sent by a Fit AP correspond from the correspondence relationship storing module 52, carry the radio parameter information configured on the virtual radio interface by the virtual radio interface configuration module 53 and the physical radio interface identifier in a configuration response, and send the configuration response to the Fit AP corresponding to the Fit AP identifier.

Figure 6:
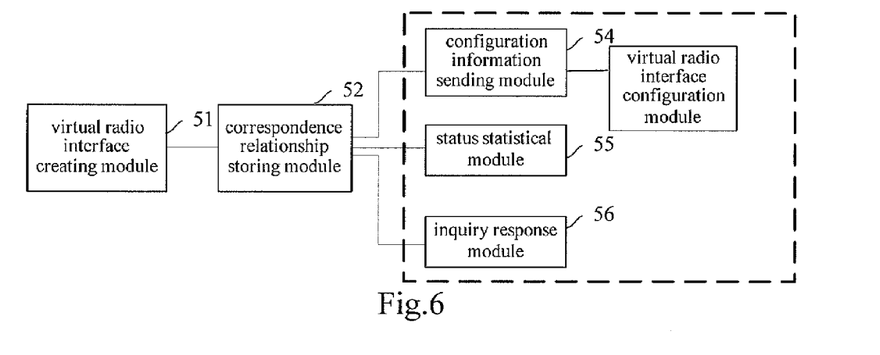
FIG. 6 is a schematic illustrating a structure of an AC under the structure of a WLAN based on Fit APs in accordance with an embodiment of the present invention.

FIG. 6 is a schematic illustrating a structure of an AC under the structure of a to WLAN based on Fit APs in accordance with an embodiment of the present invention. As shown in FIG. 6, the AC mainly includes following modules.

A virtual radio interface creating module 51 is adapted to create at least one virtual radio interface as instructed by a network administrator, and establish an Ifindex based on a standard MIB for each virtual radio interface. For example, the Ifindex of virtual radio interface 3 is 3, and the Ifindex of virtual radio interface 9 is 9. Thereby the network administrator is able to find out a virtual radio interface through the standard MIB by using a network management protocol such as SNMP, and configure and manage a physical radio interface of a Fit AP to which the virtual radio interface corresponds.

A correspondence relationship storing module 52 is adapted to store the correspondence relationship between the Ifindex of each virtual radio interface and the identification of each physical radio interface which consists of the identifier of a Fit AP the physical radio interface belongs to and the identifier of the physical radio interface. For example, number 3 indicates the third physical radio interface of Fit AP 1, while number 9 indicates the second physical radio interface of Fit AP 3.

A virtual radio interface configuration module 53 is adapted to store parameter information configured by the network administrator through a standard MIB standard on a virtual radio interface. The parameter information is usually stored as configuration files. Since the way for storing the parameter information is determined by inner implementing of the device, due to the mechanism of the inner implementing of the device may be different, the format of files may also be different, as long as the AC agent is able to find out information in the configuration files and is able to respond to the network administrator properly when the network administrator reads or writes the parameter information configured through the MIB.

A configuration information sending module 54 is adapted to obtain an Ifindex of a virtual radio interface to which a Fit AP identifier and a physical radio interface identifier carried in a configuration request sent by a Fit AP correspond from the correspondence relationship storing module 53, send the radio parameter information configured on the virtual radio interface by the virtual radio interface configuration module 53 and the physical radio interface identifier to the Fit AP corresponding to the Fit AP identifier.

A status statistical module 55 is adapted to receive a protocol message carrying information including an identifier of a Fit AP, an identifier of a physical radio interface and status statistical data of the physical radio interface from the Fit AP; obtain an Ifindex of a virtual radio interface to which the Fit AP identifier and the physical radio interface identifier correspond from the correspondence relationship storing module 52, find out the virtual radio interface according to the Ifindex, and store the information including the status statistical data of the physical radio interface carried in the protocol message on the virtual radio interface corresponding to the Ifindex.

An inquiry response module 56 is adapted to receive an SNMP inquiry request carrying an Ifindex from an external device such as a network administrator, find out the virtual radio interface according to the Ifindex, and carry the status information and status statistical information stored on the virtual radio interface in an SNMP inquiry response, and send the SNMP inquiry response to the network administrator.

In the above description, the virtual radio interface configuration module 53 stores the parameter information configured by a network administrator through a standard MIB on the virtual radio interface. In practice, after storing the parameter information configured by the network administrator through the standard MIB on the virtual radio interface, the virtual radio interface configuration module 53 may further obtain the identifier of the physical radio interface to which the interface index of the virtual radio interface corresponds, which consists of the identifier of a Fit AP the physical radio interface belongs to and the identifier of the physical radio interface, from the correspondence relationship storing module 52, and store correspondence relationship between configured parameter information on each virtual radio interface and the identification of each physical radio interface which consists of the identifier of the Fit AP the physical radio interface belongs to and the identifier of the physical radio interface in a configuration storing module. The configuration storing module is adapted to store the correspondence relationship between configured parameter information on each virtual radio interface and the identification of each physical radio interface which consists of the identifier of the Fit AP the physical radio interface belongs to and the identifier of the physical radio interface. After obtaining the Fit AP identifier and the physical radio interface identifier carried in the configuration request sent by the Fit AP, the configuration sending module 54 will not have to find out the Ifindex of the virtual radio interface to which the Fit AP identifier and the physical radio interface identifier correspond, but can directly read the parameter information corresponding to the Fit AP identifier and the physical radio interface identifier from the configuration storing module, and then send the parameter information and the physical radio interface identifier to the Fit AP. It can be seen that, the objective of establishing a radio interface template and storing the correspondence relationship between the interface index of each radio interface template and each physical radio interface of each Fit AP is to integrate functions of the network administration and device configuration sending seamlessly.

The method provided by embodiments of the present invention may be applied to not only wireless devices supporting CAPWAP of IETF, but also wireless devices supporting 802.11 protocol extensions or other wireless technical protocols (such as RFID). The development of centralized management techniques of WLAN is not necessarily limited in the CAPWAP protocol, and wireless access standards is also not limited in 802.11, RFID, etc. The technical scheme provided by the present invention enables re-use of an existing MIB easily for centralized management of the WLAN, without having to develop a new MIB for each new standard or without having to develop extra network management software for private MIBs.

The described embodiments may be implemented by computer programs (the present invention does not exclude hardware implementations), essentially, it may be a computer program product which may be recorded in various storage media. A skilled person in the art should understand that, the embodiments of the present invention may be a computer program product including commands. When executed, the computer program product causes a hardware platform to carry out the method mentioned above. A skilled person in the art should understand that the device according to the present invention may include the computer program product and the hardware platform running the computer program.

The foregoing description is only preferred embodiments of the present invention and is not for use in limiting the protection scope thereof. All the modifications, equivalent replacements or improvements in the scope of spirit and principles of the present invention shall be included in the protection scope of the present invention.

The invention claimed is:

1. A method for configuring an access point AP, employed by an access controller AC, comprising:
    creating a virtual radio interface on the AC, which is assigned a standard Management Information Base MIB interface index, wherein the virtual radio interface corresponds to a physical radio interface of an AP; and the physical radio interface is uniquely identified according to a correspondence relationship between the interface index of the virtual radio interface and an identification of the physical radio interface, wherein the identification of the physical radio interface consists of an identifier of the AP the physical radio interface belongs to and an identifier of the physical radio interface;
    when receiving a configuration request from the AP,
    searching for the interface index of the virtual radio interface to which the identification of the physical radio interface which consists of the identifier of the AP the physical radio interface belongs and the identifier of the physical radio interface carried in the configuration request sent by the AP;
    sending configuration information on the virtual radio interface to the AP as a configuration response, wherein the configuration information is configured on the virtual radio interface according to the standard MIB.

2. The method of claim 1, further comprising:
    determining, when there is need to manage the physical radio interface, the virtual radio interface to which the physical radio interface corresponds, and storing management information on the physical radio interface on the determined virtual radio interface.

3. The method of any of claim 1, wherein the method comprises: when there is need to manage the physical radio interface,
receiving management information of the physical radio interface from the AP
determining the interface index of the virtual radio interface corresponding to the physical radio interface;
storing the management information of the physical radio interface on the virtual radio interface corresponding to the determined interface index.

4. The method of claim 1, wherein the standard MIB comprises MIBs defined in 802.11 protocols.

5. The method of claim 2, wherein the management information comprises status information or status statistical information.

6. The method of claim 3, wherein after storing the management information of the physical radio interface on the virtual radio interface corresponding to the determined interface index, the method further comprises:
receiving an inquiry request from a network administrator, and sending the management information stored on the virtual radio interface corresponding to the interface index carried in the inquiry request to the network administrator.

7. The method of claim 6, wherein information interaction between the AC and the AP is based on the Configuration And Provisioning for Wireless Access Point CAPWAP protocol, and information interaction between the AC and the network administrator is based on the Simple Network Management Protocol SNMP.

8. A method for managing an access point AP, applied to an access controller AC, comprising:
creating a virtual radio interface on the AC, which is assigned a standard Management Information Base MIB interface index, wherein the virtual radio interface corresponds to a physical radio interface of the AP; and the physical radio interface is uniquely identified according to a correspondence relationship between the interface index of the virtual radio interface and an identification of the physical radio interface, wherein the identification of the physical radio interface consists of an identifier of the AP the physical radio interface belongs to and an identifier of the physical radio interface;
receiving management information of the physical radio interface reported by the AP through a channel between the AC and the AP, determining the virtual radio interface corresponding to the physical radio interface according to the correspondence relationship and storing the management information of the physical radio interface on the virtual radio interface;
receiving an inquiry request from a network administrator for the physical radio interface, search for the interface index of the virtual radio interface to which the identification of the physical radio interface which consists the identifier of the AP the physical radio interface belongs to and the identifier of the physical radio interface carried in the inquiry request, sending the management information of the physical radio interface stored on the virtual radio interface to the network administrator through a management channel between the AC and the network administrator.

9. The method of claim 8, wherein the management channel between the AC and the network administrator is different with the channel between the AC and the AP.

10. The method of claim 8, wherein the standard MIB comprises a MIB defined in an 802.11 protocol.

11. The method of claim 9, wherein the channel between the AC and the AP is based on the Configuration And Provisioning for Wireless Access Point CAPWAP protocol, and the management channel the AC and the network administrator is based on the Simple Network Management Protocol SNMP.

12. An access controller AC, comprising:
a first module, adapted to create a virtual radio interface, which is assigned a standard Management Information Base MIB interface index, wherein the virtual radio interface corresponds to a physical radio interface of an AP;
a second module, adapted to determine, when there is a need to send configuration information to the physical radio interface, the virtual radio interface to which the physical radio interface correspond and send configuration information on the determined virtual radio interface to the physical radio interface, wherein the configuration information on the determined virtual radio interface is configured according to a standard MIB;
a fourth module, adapted to store a correspondence relationship between the interface index of the virtual radio interface and an identification of the physical radio interface, wherein the identification of the physical radio interface consists of an identifier of the AP the physical radio interface belongs to and an identifier of the physical radio interface;
wherein, the second module comprises:
a first sub-module, adapted to configure radio parameter configuration information on the virtual radio interface according to the standard MIB;
a second sub-module, adapted to search the fourth module for the interface index of the virtual radio interface to which the identification of the physical radio interface which consists of the identifier of the AP the physical radio interface belongs to and the identifier of the physical radio interface carried in a configuration request sent by the AP; and send the configuration information on the virtual radio interface corresponding to the found interface index and the identifier of the physical radio interface to the AP.

13. The AC of claim 12, further comprising:
a third module, adapted to determine the virtual radio interface to which the physical radio interface corresponds and store management information of the physical radio interface on the determined virtual radio interface.

14. The AC of claim 13, wherein the third module comprises:
a first sub-module, adapted to receive management information of the physical radio interface from the AP, search the fourth module for the interface index of the virtual radio interface to which the identification of the physical radio interface which consists of the identifier of the AP the physical radio interface belongs to and the identifier of the physical radio interface carried in the management information; store the management information of the physical radio interface on the virtual radio interface corresponding to the found interface index;
a second sub-module, adapted to receive an inquiry request from a network administrator for the physical radio interface, search the fourth module for the interface index of the virtual radio interface to which the identification of the physical radio interface which consists of the identifier of the AP the physical radio interface belongs to and the identifier of the physical radio interface carried in the inquiry request; and send the management information stored on the virtual radio interface corresponding to the found interface index to the network administrator.

15. An access controller (AC) comprising:

a first module, adapted to create a virtual radio interface, which is assigned a standard Management Information Base MIB interface index, wherein the virtual radio interface corresponds to a physical radio interface of an AP;

a second module, adapted to determine, when there is a need to send configuration information to the physical radio interface, the virtual radio interface to which the physical radio interface correspond and send configuration information on the determined virtual radio interface to the physical radio interface, wherein the configuration information on the determined virtual radio interface is configured according to a standard MIB;

a fourth module, adapted to store a correspondence relationship between the interface index of the virtual radio interface and an identification of the physical radio interface, wherein the identification of the physical radio interface consists of an identifier of the AP the physical radio interface belongs to and an identifier of the physical radio interface;

wherein the second module comprises:

a first sub-module, adapted to configure radio parameter configuration information on the virtual radio interface according to the standard MIB, search the fourth module for the identification of the physical radio interface to which the interface index of the virtual radio interface correspond and store correspondence relationship between the radio parameter configuration information configured on the virtual radio interface and the identification of the physical radio interface in a second sub-module;

the second sub-module, adapted to store the correspondence between the radio parameter configuration information configured on the virtual radio interface and the identification of the physical radio interface;

a third sub-module, adapted to search the second sub-module for configuration information to which the identification of the physical radio interface which consists of the identifier of the AP the physical radio interface belongs to and the identifier of the physical radio interface carried in a configuration request sent by the AP; and send the configuration information and the identifier of the physical radio interface to the AP.

16. An access controller, which is used in a centralized wireless local area network for controlling at least one access point, comprising:

a first module, adapted to create a virtual radio interface, which is assigned a standard Management Information Base MIB interface index, wherein the virtual radio interface corresponds to a physical radio interface of an AP;

a third module, adapted to determine the virtual radio interface to which the physical radio interface corresponds and store management information of the physical radio interface on the determined virtual radio interface;

a fourth module, adapted to store a correspondence relationship between the interface index of the virtual radio interface and an identification of the physical radio interface, wherein the identification of the physical radio interface consists of an identifier of the AP the physical radio interface belongs to and an identifier of the physical radio interface;

wherein the third module comprises:

a first sub-module, adapted to receive management information of the physical radio interface from the AP, search the fourth module for the interface index of the virtual radio interface to which the identification of the physical radio interface which consists of the identifier of the AP the physical radio interface belongs to and the identifier of the physical radio interface carded in the management information; store the management information of the physical radio interface on the virtual radio interface corresponding to the found interface index;

a second sub-module, adapted to receive an inquiry request from a network administrator for the physical radio interface, search the fourth module for the interface index of the virtual radio interface to which the identification of the physical radio interface which consists of the identifier of the AP the physical radio interface belongs to and the identifier of the physical radio interface carried in the inquiry request; and send the management information stored on the virtual radio interface corresponding to the found interface index to the network administrator.

\* \* \* \* \*

UNITED STATES PATENT AND TRADEMARK OFFICE
CERTIFICATE OF CORRECTION

PATENT NO. : 8,396,045 B2
APPLICATION NO. : 12/344616
DATED : March 12, 2013
INVENTOR(S) : Yang Shi It is certified that error appears in the above-identified patent and that said Letters Patent is hereby corrected as shown below:

In the Claims

In column 15, line 4, in Claim 3, delete "of any of" and insert -- of --, therefor.

In column 18, line 31, in Claim 16, delete "carded" and insert -- carried --, therefor.

Signed and Sealed this
Thirtieth Day of July, 2013

Teresa Stanek Rea
*Acting Director of the United States Patent and Trademark Office*